US 11,491,860 B2

(12) United States Patent
Satyaseelan et al.

(10) Patent No.: US 11,491,860 B2
(45) Date of Patent: Nov. 8, 2022

(54) HYBRID MODULE WITH BEARING SUPPORT

(71) Applicant: Schaeffler Technologies AG & Co. KG, Herzogenaurach (DE)

(72) Inventors: Ayyalraju Satyaseelan, Wooster, OH (US); Charles Schwab, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 49 days.

(21) Appl. No.: 16/872,798

(22) Filed: May 12, 2020

(65) Prior Publication Data

US 2021/0354545 A1  Nov. 18, 2021

(51) Int. Cl.
*B60K 6/20* (2007.10)
*B60K 6/38* (2007.10)
*B60K 6/24* (2007.10)
*B60K 6/26* (2007.10)

(52) U.S. Cl.
CPC .................. *B60K 6/38* (2013.01); *B60K 6/24* (2013.01); *B60K 6/26* (2013.01); *B60Y 2200/92* (2013.01); *B60Y 2400/42* (2013.01); *B60Y 2400/60* (2013.01)

(58) Field of Classification Search
CPC ... B60K 6/38; B60K 6/24; B60K 6/26; B60K 6/00; B60K 6/20; B60K 6/22; B60K 6/387; B60K 6/40; B60K 6/405; B60Y 2200/92; B60Y 2400/42; B60Y 2400/60; F16D 25/0638; F16D 25/06; F16D 25/062; F16D 25/0635; F16D 25/00
See application file for complete search history.

(56) References Cited

U.S. PATENT DOCUMENTS

| 6,354,974 | B1* | 3/2002 | Kozarekar | B60K 6/26 |
| | | | | 475/5 |
| 7,255,186 | B2* | 8/2007 | Wakuta | B60K 6/365 |
| | | | | 477/3 |
| 8,322,504 | B2* | 12/2012 | Mueller | F16D 25/0638 |
| | | | | 192/85.25 |
| 8,652,001 | B2* | 2/2014 | Iwase | H02K 7/006 |
| | | | | 477/8 |

(Continued)

FOREIGN PATENT DOCUMENTS

JP  2007230341 A  9/2007
WO  2019197250 A1  10/2019

*Primary Examiner* — James M Dolak

(57) ABSTRACT

A hybrid module includes a housing with a bulkhead wall, a K0 shaft, a rotor assembly, a rotor carrier and a first bearing. The K0 shaft is arranged for driving connection with a crankshaft. The rotor assembly has an electric motor rotor and a thrust surface for a K0 clutch. The K0 clutch is arranged to drivingly connect the rotor assembly to the K0 shaft. The rotor carrier is fixed to the rotor assembly and the first bearing is arranged to rotationally separate the bulkhead wall and the rotor carrier. In an example embodiment, the first bearing is a deep groove ball bearing. In an example embodiment, the hybrid module includes a seal installed in the bulkhead wall and contacting the K0 shaft. In an example embodiment, the hybrid module includes a bushing installed on the K0 shaft and arranged for contacting an inner bore of the crankshaft.

18 Claims, 3 Drawing Sheets

(56) References Cited

U.S. PATENT DOCUMENTS

| | | | | |
|---|---|---|---|---|
| 8,839,922 B2* | 9/2014 | Ideshio | | B60K 6/40 |
| | | | | 192/3.25 |
| 8,942,902 B2* | 1/2015 | Moseler | | B60K 6/48 |
| | | | | 701/68 |
| 8,955,658 B2* | 2/2015 | Ideshio | | B60K 6/48 |
| | | | | 192/3.26 |
| 9,085,291 B2* | 7/2015 | Fushiki | | B60W 20/40 |
| 9,447,864 B2* | 9/2016 | Iwase | | F16H 57/045 |
| 9,453,572 B2* | 9/2016 | Tamai | | F16H 57/021 |
| 9,677,646 B2* | 6/2017 | Kasuya | | B60L 50/16 |
| 10,293,674 B1* | 5/2019 | Wilton | | B60K 6/40 |
| 10,632,832 B2* | 4/2020 | Agner | | F16D 25/14 |
| 11,161,404 B2* | 11/2021 | Reitz | | B60K 17/02 |
| 11,198,357 B2* | 12/2021 | Reimnitz | | H02K 7/108 |
| 11,199,224 B2* | 12/2021 | Rentfrow | | F16C 33/38 |
| 11,199,250 B2* | 12/2021 | Podschwadt | | B60K 6/387 |
| 11,241,947 B2* | 2/2022 | Suyama | | F16H 1/46 |
| 11,267,331 B2* | 3/2022 | Reimnitz | | F16D 13/385 |
| 11,292,331 B2* | 4/2022 | MacMillian | | B60K 6/20 |
| 11,300,163 B2* | 4/2022 | Payne | | B60K 6/40 |
| 11,305,631 B2* | 4/2022 | Agner | | B60K 6/387 |
| 11,312,226 B2* | 4/2022 | Agner | | B60K 6/387 |
| 11,358,462 B2* | 6/2022 | Guinot | | B60K 6/26 |
| 11,365,793 B2* | 6/2022 | Nelson | | B60K 6/405 |
| 2008/0023287 A1* | 1/2008 | Thiede | | B60K 6/40 |
| | | | | 192/48.1 |
| 2010/0003820 A1 | 1/2010 | Iba | | |
| 2010/0038201 A1 | 2/2010 | Mueller et al. | | |
| 2012/0080286 A1* | 4/2012 | Kasuya | | B60K 6/48 |
| | | | | 192/113.3 |
| 2019/0273410 A1 | 9/2019 | Satyaseelan | | |
| 2019/0308496 A1* | 10/2019 | Reimnitz | | B60K 6/48 |
| 2020/0014283 A1 | 1/2020 | Payne et al. | | |
| 2020/0040974 A1 | 2/2020 | Payne et al. | | |
| 2020/0094668 A1 | 3/2020 | Podschwadt et al. | | |
| 2020/0346537 A1* | 11/2020 | Metzdorf | | B60K 6/48 |

\* cited by examiner

HYBRID MODULE WITH BEARING SUPPORT

TECHNICAL FIELD

The present disclosure relates generally to a hybrid module, and more specifically to a hybrid module with a bearing support.

BACKGROUND

Hybrid modules are known. One example is shown in commonly assigned United States Patent Publication No. 2019/0273410, hereby incorporated by reference as if set forth fully herein.

SUMMARY

Example aspects broadly comprise a hybrid module including a housing, a K0 shaft, a rotor assembly, a rotor carrier and a first bearing. The housing includes a bulkhead wall. The K0 shaft is arranged for driving connection with a crankshaft of an internal combustion engine. The rotor assembly has an electric motor rotor and a thrust surface for a K0 clutch. The K0 clutch is arranged to drivingly connect the rotor assembly to the K0 shaft. The rotor carrier is fixed to the rotor assembly and the first bearing is arranged to rotationally separate the bulkhead wall and the rotor carrier. In an example embodiment, the first bearing is a deep groove ball bearing. In an example embodiment, the hybrid module includes a seal installed in the bulkhead wall and contacting the K0 shaft. In an example embodiment, the hybrid module includes a bushing installed on the K0 shaft and arranged for contacting an inner bore of the crankshaft. In an example embodiment, the hybrid module has a damper arranged for transmitting a torque from the crankshaft to the K0 shaft.

In some example embodiments, the hybrid module includes a second bearing arranged to rotationally separate a first axial load between the rotor carrier and the K0 shaft, and a third bearing arranged to rotationally separate a second axial load between the K0 shaft and the bulkhead wall. The first bearing is arranged to rotationally separate a first radial load between the bulkhead wall and the rotor carrier. In an example embodiment, the first bearing is a deep groove ball bearing, the second bearing is a needle roller thrust bearing, and the third bearing is a cylindrical thrust bearing. In an example embodiment, the hybrid module includes a first snap ring installed in a first groove of the K0 shaft to axially retain the third bearing on the K0 shaft.

In an example embodiment, the hybrid module includes a fourth bearing arranged to rotationally separate a second radial load between the bulkhead wall and the K0 shaft. In some example embodiments, the K0 shaft includes a shaft portion and a clutch carrier portion fixed to the shaft portion, and the second bearing is installed axially between the rotor carrier and the clutch carrier portion. In an example embodiment, the hybrid module includes a first sleeve arranged axially between the second bearing and the rotor carrier.

In some example embodiments, the hybrid module includes a second sleeve fixed relative to the bulkhead wall, and the second sleeve has a radially extended shoulder arranged to axially retain the first bearing. In an example embodiment, the hybrid module includes a second snap ring arranged in a second groove of the rotor carrier to axially fix the first bearing with respect to the rotor carrier. In some example embodiments, the bulkhead wall has a first tubular portion and the second sleeve has a second tubular portion installed in the first tubular portion. In an example embodiment, the hybrid module includes a fifth bearing arranged to rotationally separate a third radial load between the K0 shaft and the second tubular portion.

In some example embodiments, the hybrid module includes a third snap ring. The bulkhead wall has a third groove, the second sleeve has a fourth groove, and the third snap ring is installed in the third groove and the fourth groove to axially fix the second sleeve in the bulkhead wall. In an example embodiment, the bulkhead wall includes an axial groove connected to the third groove for receiving a tool to radial compress the third snap ring during disassembly of the hybrid module. In an example embodiment, the second sleeve is fixed to the bulkhead wall by a threaded fastener.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
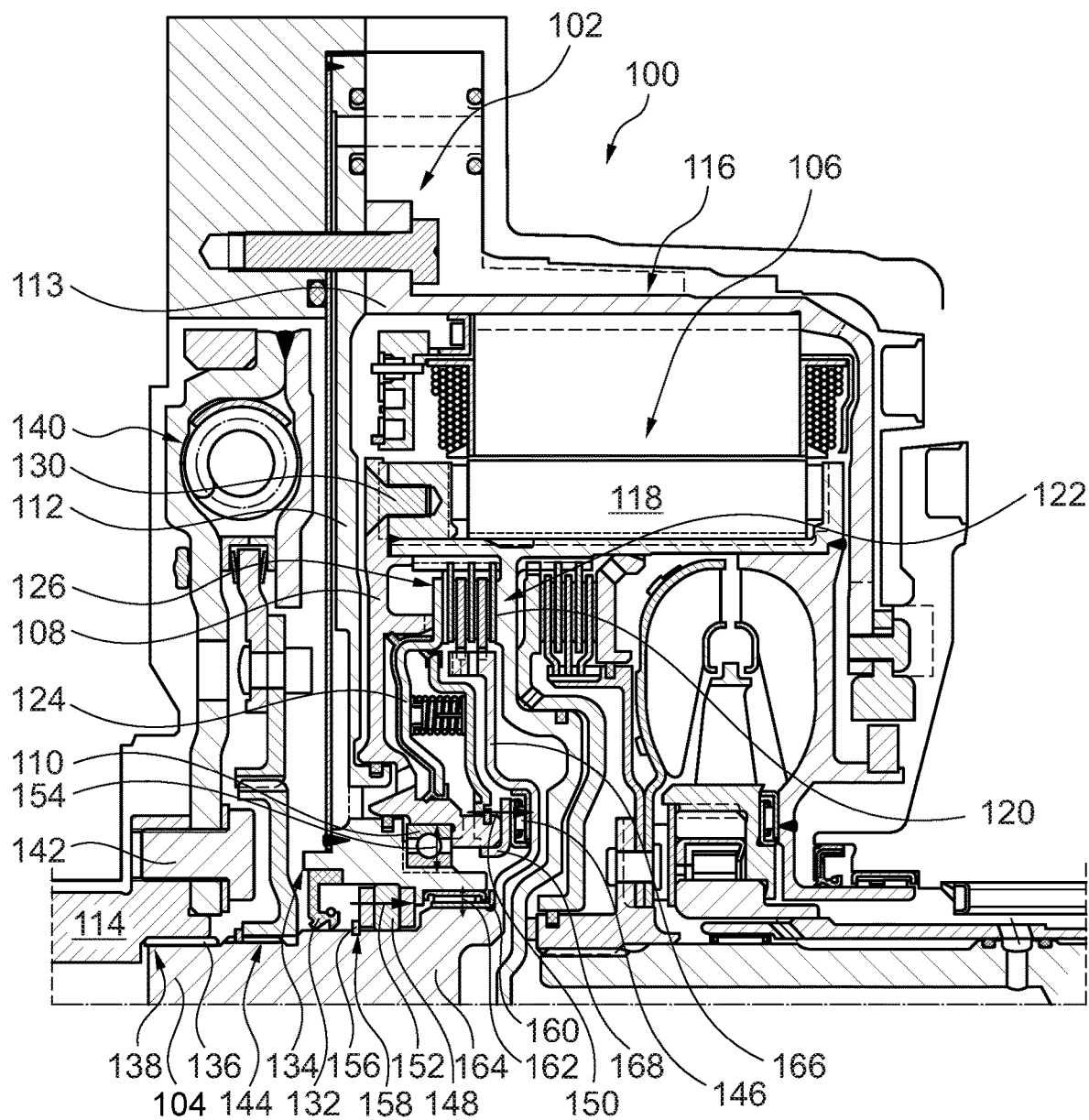
FIG. 1 illustrates a top-half cross-sectional view of a hybrid module according to a first example embodiment of the disclosure.

The following description is made with reference to FIG. 1. FIG. 1 illustrates a top-half cross-sectional view of hybrid module 100 according to a first example embodiment of the disclosure. Hybrid module 100 includes housing 102, K0 shaft 104, rotor assembly 106, rotor carrier 108 and bearing 110. The housing includes bulkhead wall 112. In the embodiment shown in FIG. 2, the bulkhead wall is a separate component fixed to housing body 113 but other embodiments (not shown) may include a housing body with an integral bulkhead wall formed from a same piece of material. The K0 shaft is arranged for driving connection with crankshaft 114 of an internal combustion engine. In other words, the K0 shaft is arranged to receive torque from the engine and/or transmit torque to the engine when installed and operated in a vehicle powered at least in part by the engine.

Rotor assembly 106 includes electric motor 116 with electric motor rotor 118 and thrust surface 120 for K0 clutch 122. The K0 clutch is arranged to drivingly connect the rotor assembly to the K0 shaft. In other words, clutch 122 selectively connects and disconnects the rotor assembly and the K0 shaft. In the embodiment shown in FIG. 1, the clutch is hydraulically operated such that piston 124 clamps clutch plates 126 against thrust surface 120 to close the clutch. The resulting force, or axial load, from the piston acting on the thrust surface is reacted back through to the housing as described herein.

Rotor carrier 108 is fixed to the rotor assembly by fasteners 130, for example. Bearing 110 is arranged to rotationally separate the bulkhead wall and the rotor carrier. That is, the bearing provides a low friction connection between the two components. Bearings transmit axial and/or radial forces between components with low friction using rolling elements such as balls, cylinders, or needle rollers, for example. Bushings perform a similar function with mating metal or plastic surfaces, often with low friction coatings, for example.

Module 100 also includes seal 132 installed in counterbore 134 of the bulkhead wall and contacts the K0 shaft to prevent debris from entering the hybrid module, for example. The hybrid module also includes bushing 136 installed on the K0 shaft and arranged for contacting inner bore 138 of crankshaft 114 and damper 140 arranged for transmitting a torque from the crankshaft to the K0 shaft. In the embodiment shown, damper 140 is bolted to the crankshaft with fasteners 142 and drivingly engaged with the K0 shaft at spline 144 to reduce torsional vibrations of torque transmitted from the engine to the K0 shaft, and vice versa.

Hybrid module 100 also includes bearing 146 and bearing 148. Bearing 146 is arranged to rotationally separate axial load 150 between the rotor carrier and the K0 shaft, and bearing 148 is arranged to rotationally separate axial load 152 between the K0 shaft and the bulkhead wall. Bearing 110 is arranged to rotationally separate radial load 154 between the bulkhead wall and the rotor carrier. In the example shown, bearing 110 is a deep groove ball bearing, bearing 146 is a needle roller thrust bearing, and bearing 148 is a cylindrical thrust bearing. Snap ring 156 is installed in groove 158 of the K0 shaft to axially retain bearing 148 on the K0 shaft.

Hybrid module 100 also includes bearing 160 arranged to rotationally separate radial load 162 between the bulkhead wall and the K0 shaft. K0 shaft 104 includes shaft portion 164 and clutch carrier portion 166 fixed to the shaft portion. Bearing 146 is installed axially between the rotor carrier and the clutch carrier portion. The hybrid module also includes sleeve 168 arranged axially between the bearing 146 and the rotor carrier.

Figure 2:
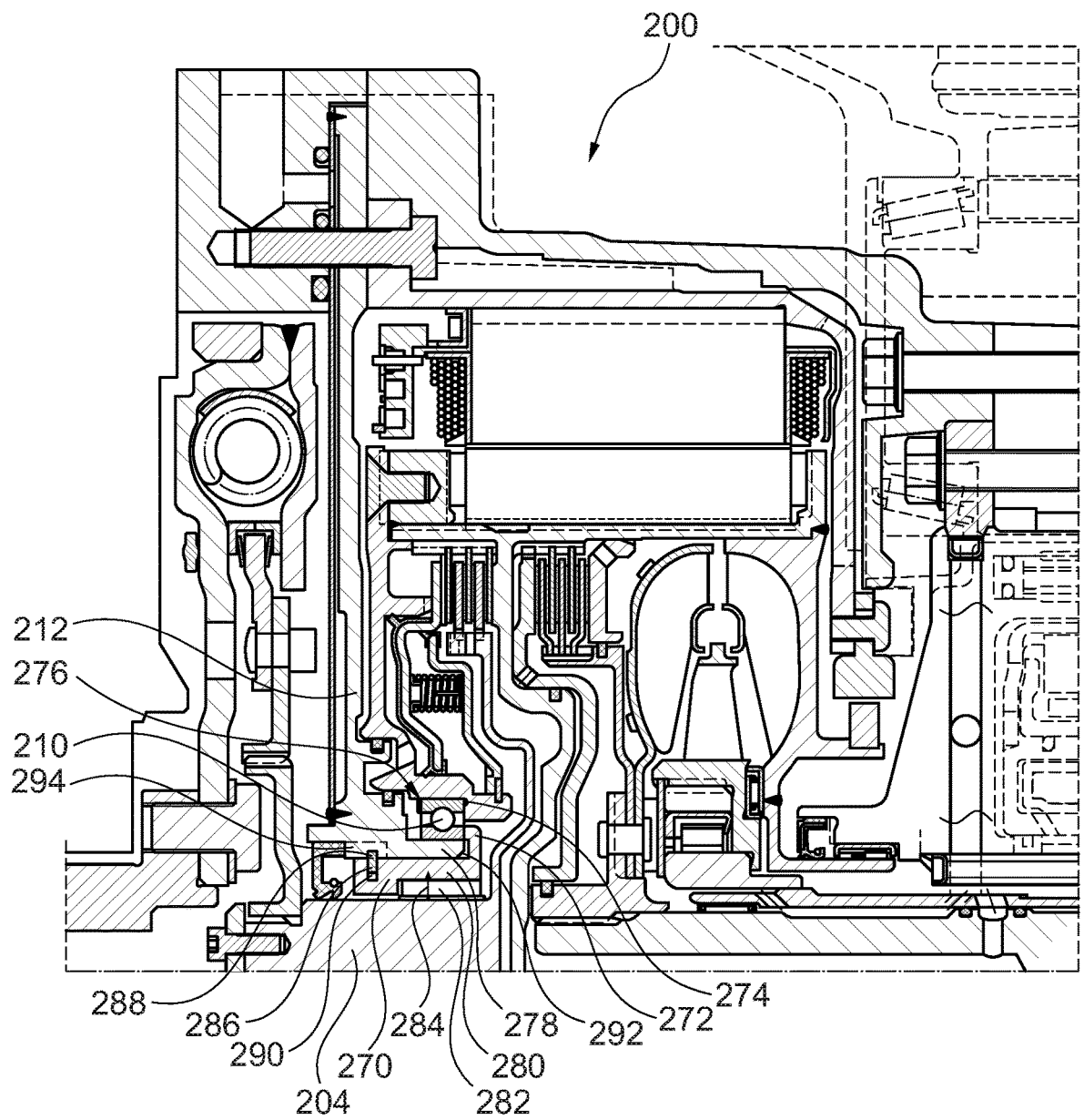
FIG. 2 illustrates a top-half cross-sectional view of a hybrid module according to a second example embodiment of the disclosure.

The following description is made with reference to FIG. 2. FIG. 2 illustrates a top-half cross-sectional view of hybrid module 200 according to a second example embodiment of the disclosure. Hybrid module 200 is similar to hybrid module 100 with 2XX labels corresponding to 1XX labels except as described below. Hybrid module 200 includes sleeve 270 fixed relative to bulkhead wall 212. Sleeve 270 includes radially extended shoulder 272 arranged to axially retain bearing 210. Module 200 includes snap ring 274 arranged in groove 276 of rotor carrier 208 to axially fix bearing 210 with respect to the rotor carrier.

Bulkhead wall 212 includes tubular portion 278 and sleeve 270 includes tubular portion 280 installed in tubular portion 278. Hybrid module 200 includes bearing 282 arranged to rotationally separate radial load 284 between K0 shaft 204 and tubular portion 280. Hybrid module 200 includes snap ring 286. Bulkhead wall 212 includes groove 288, sleeve 270 includes groove 290, and snap ring 286 is installed in grooves 288 and 290 to axially fix sleeve 270 in the bulkhead wall. Snap ring 286 is installed in the sleeve groove and radially compressed by chamfer 292 during assembly. Tubular portion 278 of the bulkhead wall keeps the spring compressed until it expands into groove 288 of the bulkhead wall. The bulkhead wall includes axial groove 294 connected to groove 288 for receiving a tool (not shown) to radially compress snap ring 286 during disassembly of the hybrid module. That is, in order to separate the sleeve from the bulkhead wall, a tool (not shown) is inserted the axial groove to compress the snap ring into the sleeve groove and out of the bulkhead wall groove so that the sleeve can be removed from the bulkhead wall.

Figure 3:
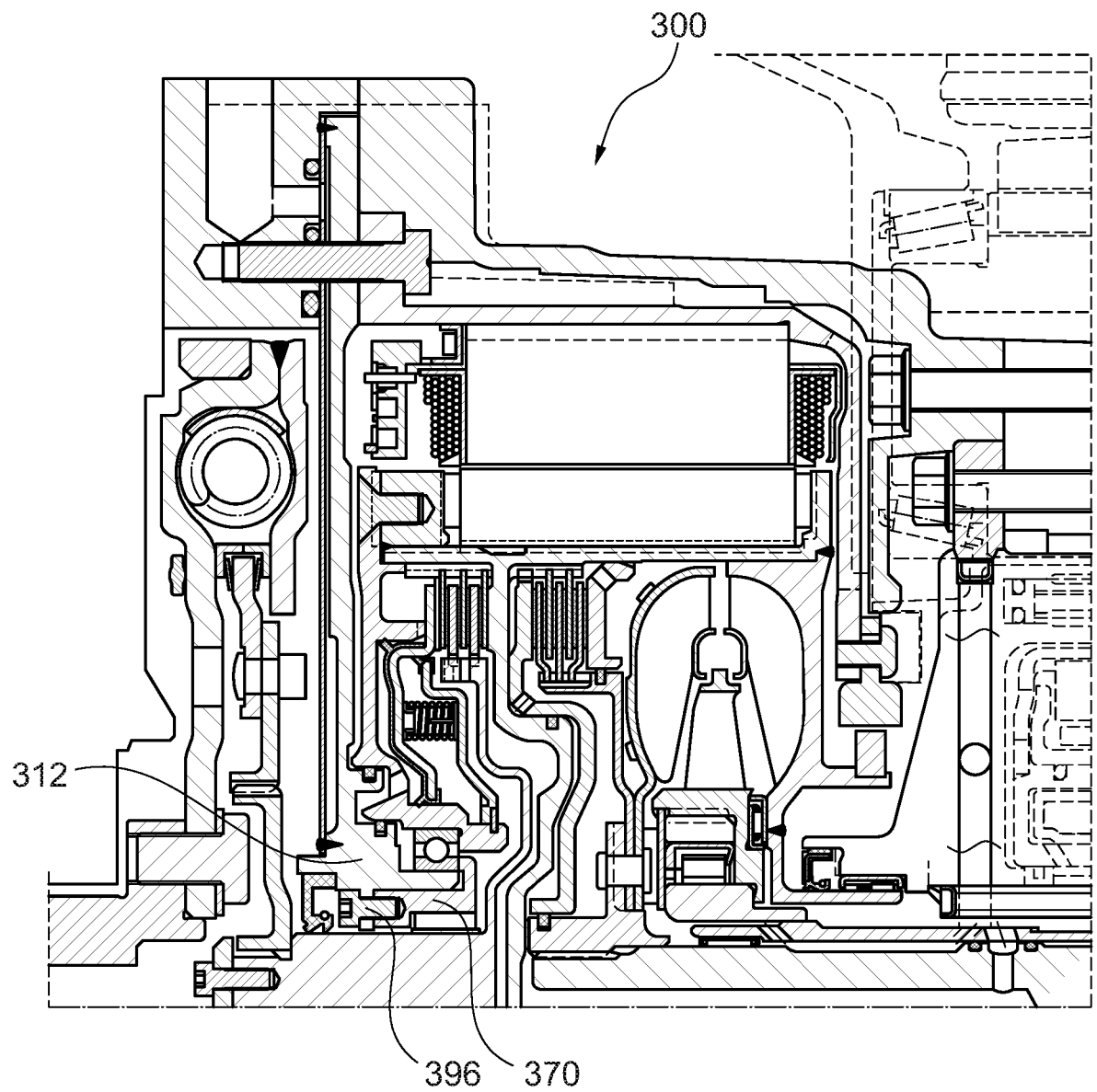
FIG. 3 illustrates a top-half cross-sectional view of a hybrid module according to a third example embodiment of the disclosure.

The following description is made with reference to FIG. 3. FIG. 3 illustrates a top-half cross-sectional view of hybrid module 300 according to a third example embodiment of the disclosure. Hybrid module 300 is similar to hybrid modules 100 and 200 with 3XX labels corresponding to 2XX labels except as described below. In the embodiment shown, sleeve 370 is fixed to bulkhead wall 312 by threaded fastener 396.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
102 Housing
104 K0 shaft
106 Rotor assembly
108 Rotor carrier

110 Bearing (first)
112 Bulkhead wall
113 Housing body
114 Crankshaft
116 Electric motor
118 Electric motor rotor
120 Thrust surface
122 K0 clutch
124 Piston
126 Clutch plate
130 Fasteners (rotor carrier)
132 Seal
134 Counterbore (bulkhead wall)
136 Bushing
138 Inner bore (crankshaft)
140 Damper
142 Fasteners (damper)
144 Spline
146 Bearing (second)
148 Bearing (third)
150 Axial load (first)
152 Axial load (second)
154 Radial load (first)
156 Snap ring (first)
158 Groove (first)
160 Bearing (fourth)
162 Radial load (second)
164 Shaft portion (K0 shaft)
166 Clutch carrier portion (K0 shaft)
168 Sleeve (first)
200 Hybrid module
204 K0 shaft
208 Rotor carrier
210 Bearing (first)
212 Bulkhead wall
270 Sleeve (second)
272 Radially extended shoulder
274 Snap ring (second)
276 Groove (second)
278 Tubular portion (first, bulkhead wall)
280 Tubular portion (second, sleeve)
282 Bearing (fifth)
284 Radial load (third)
286 Snap ring (third)
288 Groove (third)
290 Groove (fourth)
292 Chamfer (bulkhead wall)
294 Axial groove
300 Hybrid module
312 Bulkhead wall
370 Sleeve (second)
396 Threaded fastener

What is claimed is:

1. A hybrid module, comprising:
a housing comprising a bulkhead wall;
a K0 shaft arranged for driving connection with an internal combustion engine crankshaft;
a rotor assembly comprising an electric motor rotor and a thrust surface for a K0 clutch, the K0 clutch being arranged to drivingly connect the rotor assembly to the K0 shaft;
a rotor carrier fixed to the rotor assembly; and
a first bearing arranged to rotationally separate the bulkhead wall and the rotor carrier.

2. The hybrid module of claim 1, wherein the first bearing is a deep groove ball bearing.

3. The hybrid module of claim 1 further comprising a seal installed in the bulkhead wall and contacting the K0 shaft.

4. The hybrid module of claim 1 further comprising a bushing installed on the K0 shaft and arranged for contacting an inner bore of the crankshaft.

5. The hybrid module of claim 1 further comprising a damper arranged for transmitting torque from the crankshaft to the K0 shaft.

6. The hybrid module of claim 1, further comprising:
a second bearing arranged to rotationally separate a first axial load between the rotor carrier and the K0 shaft; and
a third bearing arranged to rotationally separate a second axial load between the K0 shaft and the bulkhead wall, wherein the first bearing is arranged to rotationally separate a first radial load between the bulkhead wall and the rotor carrier.

7. The hybrid module of claim 6 wherein the first bearing is a deep groove ball bearing, the second bearing is a needle roller thrust bearing, and the third bearing is a cylindrical thrust bearing.

8. The hybrid module of claim 6 further comprising a first snap ring installed in a first groove of the K0 shaft to axially retain the third bearing on the K0 shaft.

9. The hybrid module of claim 6 further comprising a fourth bearing arranged to rotationally separate a second radial load between the bulkhead wall and the K0 shaft.

10. The hybrid module of claim 6 wherein the K0 shaft comprises a shaft portion and a clutch carrier portion fixed to the shaft portion, and the second bearing is installed axially between the rotor carrier and the clutch carrier portion.

11. The hybrid module of claim 10 further comprising a first sleeve arranged axially between the second bearing and the rotor carrier.

12. The hybrid module of claim 1 further comprising a second sleeve fixed relative to the bulkhead wall, the second sleeve comprising a radially extended shoulder arranged to axially retain the first bearing.

13. The hybrid module of claim 12 further comprising a second snap ring arranged in a second groove of the rotor carrier to axially fix the first bearing with respect to the rotor carrier.

14. The hybrid module of claim 12 wherein the bulkhead wall comprises a first tubular portion and the second sleeve comprises a second tubular portion installed in the first tubular portion.

15. The hybrid module of claim 14 further comprising a fifth bearing arranged to rotationally separate a third radial load between the K0 shaft and the second tubular portion.

16. The hybrid module of claim 12 further comprising a third snap ring, wherein the bulkhead wall comprises a third groove, the second sleeve comprises a fourth groove, and the third snap ring is installed in the third groove and the fourth groove to axially fix the second sleeve in the bulkhead wall.

17. The hybrid module of claim 16 wherein the bulkhead wall comprises an axial groove connected to the third groove for receiving a tool to radial compress the third snap ring during disassembly of the hybrid module.

18. The hybrid module of claim 12 wherein the second sleeve is fixed to the bulkhead wall by a threaded fastener.

\* \* \* \* \*